(12) United States Patent
Coraboeuf et al.

(10) Patent No.: US 9,981,757 B2
(45) Date of Patent: May 29, 2018

(54) PROPULSION UNIT FOR REUSABLE LAUNCH VEHICLE

(71) Applicant: AIRBUS DEFENCE AND SPACE SAS, Les Mureaux (FR)

(72) Inventors: Yohann Coraboeuf, Merignac (FR); Jean-Philippe Dutheil, Martignas-sur-Jalles (FR)

(73) Assignee: AIRBUS DEFENCE & SPACE SAS (FR)

( * ) Notice: Subject to any disclaimer, the term of this patent is extended or adjusted under 35 U.S.C. 154(b) by 22 days.

(21) Appl. No.: 14/901,328

(22) PCT Filed: Jul. 4, 2014

(86) PCT No.: PCT/EP2014/064282
§ 371 (c)(1),
(2) Date: Dec. 28, 2015

(87) PCT Pub. No.: WO2015/004010
PCT Pub. Date: Jan. 15, 2015

(65) Prior Publication Data
US 2016/0257435 A1 Sep. 8, 2016

(30) Foreign Application Priority Data
Jul. 8, 2013 (FR) ..................................... 13 56695

(51) Int. Cl.
*B64G 1/00* (2006.01)
*B64G 1/40* (2006.01)
(Continued)

(52) U.S. Cl.
CPC ................ *B64G 1/401* (2013.01); *B64F 5/50* (2017.01); *B64G 1/14* (2013.01); *B64G 5/00* (2013.01);
(Continued)

(58) Field of Classification Search
CPC .......... B64G 1/14; B64G 1/401; B64G 1/641; B64G 5/00; B64G 1/62; B64G 1/002;
(Continued)

(56) References Cited

U.S. PATENT DOCUMENTS 2,940,769 A * 6/1960 Taylor ....................... B64F 1/32
254/9 C
3,066,480 A * 12/1962 Buck ......................... F02K 7/10
60/266
(Continued)

FOREIGN PATENT DOCUMENTS

EP 0038227 10/1981
EP 0893344 1/1999
(Continued)

OTHER PUBLICATIONS

International Search Report, International Application No. PCT/EP2014/064282, dated Oct. 1, 2014.

*Primary Examiner* — Medhat Badawi
(74) *Attorney, Agent, or Firm* — Perman & Green LLP

(57) ABSTRACT

The invention relates to a propulsion unit for a reusable launch vehicle including a rocket engine supported by a cradle. According to the invention, the cradle includes at least three attachment elements for assembling the unit on the structure of the vehicle to which the unit is to be connected, the at least three attachment elements defining a plane for removing the unit, and in which the unit includes one or more fluid and/or electric links of the engine, each one of the links including a free end to be assembled with a corresponding circuit for supplying the vehicle, to which the unit is to be connected, the tip of at least some of the free ends being contained in the removal plane.

16 Claims, 4 Drawing Sheets

(51) Int. Cl.
   *B64G 1/14*      (2006.01)
   *B64G 5/00*      (2006.01)
   *F02K 9/97*      (2006.01)
   *B64F 5/50*      (2017.01)
   *B64G 1/64*      (2006.01)

(52) U.S. Cl.
   CPC ............... *F02K 9/97* (2013.01); *B64G 1/641* (2013.01); *F05D 2240/90* (2013.01)

(58) Field of Classification Search
   CPC ..... B64G 1/24; B64F 5/50; F02K 9/97; F05D 2240/90; B64D 17/78
   See application file for complete search history.

(56) References Cited

U.S. PATENT DOCUMENTS

| | | | |
|---|---|---|---|
| 3,194,525 A | 7/1965 | Webb | |
| 3,215,372 A * | 11/1965 | Price | B64G 1/14 102/377 |
| 3,295,790 A * | 1/1967 | Webb | B64G 1/62 244/135 R |
| 3,471,106 A * | 10/1969 | Maes | B64G 1/26 244/169 |
| 3,929,306 A | 12/1975 | Faget et al. | |
| 3,979,087 A * | 9/1976 | Boris | B64D 27/18 244/54 |
| 4,412,774 A | 11/1983 | Legrand et al. | |
| 4,451,017 A * | 5/1984 | Marshall | B64G 1/002 244/172.2 |
| 4,452,412 A * | 6/1984 | von Pragenau | B64G 1/002 244/171.3 |
| 4,699,337 A * | 10/1987 | Lewis | B64C 1/22 244/137.1 |
| 4,741,502 A * | 5/1988 | Rosen | B64G 1/007 244/158.9 |
| 5,065,959 A * | 11/1991 | Bhatia | B64D 27/14 244/54 |
| 5,143,327 A * | 9/1992 | Martin | B64G 1/14 244/171.3 |
| 5,152,482 A * | 10/1992 | Perkins | B64G 1/22 244/159.4 |
| 5,217,187 A * | 6/1993 | Criswell | B64G 1/002 244/171.3 |
| 5,271,582 A * | 12/1993 | Perkins | B64G 1/22 244/159.4 |
| 5,568,901 A * | 10/1996 | Stiennon | B64G 1/002 244/171.3 |
| 5,779,195 A * | 7/1998 | Basuthakur | B64G 1/007 244/173.1 |
| 6,076,771 A * | 6/2000 | Bailey | B64G 1/26 244/158.9 |
| 6,131,858 A | 10/2000 | Dethienne et al. | |
| 6,158,693 A | 12/2000 | Mueller et al. | |
| 6,360,994 B2 * | 3/2002 | Hart | B64G 1/14 244/171.3 |
| 6,450,452 B1 * | 9/2002 | Spencer | B64G 1/002 244/159.3 |
| 6,454,216 B1 * | 9/2002 | Kiselev | B64G 1/14 244/159.3 |
| 6,494,406 B1 * | 12/2002 | Fukushima | B64G 1/002 244/173.3 |
| 6,612,522 B1 * | 9/2003 | Aldrin | B64G 1/002 244/159.3 |
| 6,616,092 B1 * | 9/2003 | Barnes | B64D 5/00 244/159.3 |
| 7,103,952 B2 * | 9/2006 | Appleton | F01D 25/285 244/54 |
| 7,155,898 B2 * | 1/2007 | Sota, Jr. | F02K 9/86 239/265.19 |
| 7,484,692 B1 * | 2/2009 | McKinney | B64G 1/002 244/158.9 |
| 8,047,472 B1 * | 11/2011 | Brand | B64D 17/04 244/158.1 |
| 8,646,725 B2 * | 2/2014 | Lafont | B64D 27/18 244/110 B |
| 8,720,059 B2 * | 5/2014 | West | F01D 25/285 248/544 |
| 8,727,283 B2 * | 5/2014 | Morris | B64G 1/40 244/171.1 |
| 8,833,776 B2 * | 9/2014 | Boulanger | B64F 5/0036 280/35 |
| 8,876,059 B2 * | 11/2014 | Featherstone | B64G 1/002 244/158.9 |
| 8,967,545 B2 * | 3/2015 | Manzoni | B64G 1/1021 244/158.1 |
| 8,973,873 B2 * | 3/2015 | Aston | B64G 1/402 220/562 |
| 9,174,749 B2 | 11/2015 | Prampolini et al. | |
| 9,217,389 B1 * | 12/2015 | Lee | F02K 1/11 |
| 9,309,008 B2 * | 4/2016 | Boulanger | B64F 5/0036 |
| 9,376,021 B2 * | 6/2016 | Engel | B60L 1/003 |
| 9,446,862 B2 * | 9/2016 | Barthoulot | B64G 1/401 |
| 9,643,739 B2 * | 5/2017 | Peterka, III | B64G 1/002 |
| 2009/0308237 A1 * | 12/2009 | Atmur | B64G 5/00 89/1.815 |
| 2014/0263842 A1 * | 9/2014 | Salkeld | B64G 1/14 244/159.3 |
| 2015/0034759 A1 * | 2/2015 | Featherstone | B64G 1/002 244/3.24 |
| 2016/0032867 A1 * | 2/2016 | Mahaffy | F02K 9/34 60/211 |

FOREIGN PATENT DOCUMENTS

| | | |
|---|---|---|
| FR | 2940248 | 6/2010 |
| WO | 8601484 | 3/1986 |
| WO | 9607587 | 3/1996 |

* cited by examiner

PROPULSION UNIT FOR REUSABLE LAUNCH VEHICLE

CROSS REFERENCE TO RELATED APPLICATIONS

This application is the National Stage of International Application No. PCT/EP2014/064282, having an International Filing Date of 4 Jul. 2014, which designated the United States of America, and which International Application was published under PCT Article 21(2) as WO Publication No. 2015/004010 A1, and which claims priority from, and the benefit of French Application No. 1356695, filed 8 Jul. 2013, the disclosures of which are incorporated herein by reference in their entireties.

BACKGROUND

1. Field

The presently disclosed embodiment relates to a thrust unit for a reusable launch vehicle and a launch vehicle equipped with a thrust unit of this kind.

It is also aimed at a handling assembly allowing a thrust unit of this kind to be replaced quickly and in complete safety on the ground.

2. Brief Description of Related Developments

There is a growing need in the space field for launch vehicles or payload transportation vehicles which are reusable.

This need arises particularly from the requirement to cut the cost of developing satellites, in particular small satellites, and putting them into orbit, said costs being of such magnitude that they help to limit the current use of space.

Small satellites, as such, can only be launched as an add-on to a large satellite or with other small satellites assembled on the same launcher.

It would therefore be appropriate to have a space launch vehicle, the operational cost of which would allow the dedicated launch of a small satellite.

In addition, it likewise responds to an emerging commercial need for payload and/or passenger transportation in space, whether for scientific missions, such as those destined for the International Space Station (ISS), or also for space tourism.

Reusable vehicles are known in the art, such as spacecraft, in other words vehicles capable of taking off from the ground, reaching space and returning to land on the earth.

Whereas the take-off and landing stages are realized thanks to the spacecraft's turbojet engines, the propulsion phase aimed at getting passengers to zero gravity is typically realized by means of a rocket engine.

In order to optimize the commercial potential, these spacecraft must be able to guarantee regular departures at a rate of one departure per week, for example.

If the structural materials of these spacecraft allow this rate of departures, their rocket engines, although reusable, must be dismantled after each departure for maintenance and for replacement of the propellant charge.

The current arrangement of the rocket engines in these spacecraft makes their dismantling or assembly particularly long and laborious.

In particular, these rocket engines are connected by fluid and electrical links which are difficult to access by operatives seeking to connect/disconnect them prior to the assembly/dismantling of the rocket engines.

There is therefore a great need for the arrangement of the interfaces of a reusable rocket motor on a spacecraft to be optimized.

The presently disclosed embodiment aims to overcome the disadvantages set out above by proposing a thrust unit for a space vehicle which has a particularly simple design and method of operation, the arrangement thereof in the structure of the space vehicle allowing easier assembly/dismantling operations for maintenance purposes.

SUMMARY

To this end, the presently disclosed embodiment relates to a thrust unit for a reusable launch vehicle comprising a rocket engine supported by a cradle.

According to the presently disclosed embodiment, said cradle comprises at least three fixing members for the assembly of said unit on the structure of said vehicle to which said unit is to be attached, said at least three fixing members defining a plane for dismantling said unit and said unit comprising one or several fluid and/or electrical links of said engine, each of these links comprising a free end to be assembled with a corresponding circuit for supplying the vehicle, to which said unit is to be connected, the tip of at least some of said free ends being contained in said dismantling plane.

The cradle for the fixing and support of the rocket engine is advantageously designed as a planar or substantially planar compact part. Hence, the intervention of the maintenance operative is made possible during engine assembly/dismantling operations, as the operative then has access to all the attachments and connections of the thrust unit which are placed on the same plane.

The access hatch or hatches on the spacecraft structure are likewise advantageously on the same plane. In effect, since all attachments and connections of the thrust unit are located on the same plane, a single access hatch may suffice. Alternatively, two hatches may be provided in symmetrical positions close to one another, in order to allow maintenance operations.

Simply by way of illustration, said vehicle exhibiting a longitudinal axis, said dismantling plane is a plane transverse to said axis.

Said engine is mounted in the center or in a central zone of the cradle. The engine/cradle link is preferably realized by a universal link to allow orientation of the engine during the operation thereof.

In different particular aspects of this thrust unit, each one having its particular advantages and being open to numerous possible technical combinations:

the tip of the free end of each of said links is contained in said dismantling plane, said thrust unit comprises at least one anchoring member for blocking the rotation of the engine in respect of said cradle, said at least one anchoring member being connected firstly to said engine and secondly to a corresponding anchoring point on said cradle, said cradle is extended, exhibiting in its transverse dimension a front face and a rear face, said front face being intended for assembly with said engine, said front face defining a front plane of said cradle containing at least one section of said front face, said at least one section exhibiting dimensions allowing the fixing of anchoring members of said engine.

Purely by way of illustration, the cradle exhibits a shape chosen from the group comprising a disc shape, a cross shape or also an X, an A shape, an H shape, a Y shape, a T shape.

Advantageously, said rear face defines a rear plane of said cradle, so that said front and rear planes are parallel or substantially parallel.

The cradle preferably comprises at least two different limbs, these limbs comprising at their distal end one or several fixing members for the assembly of said unit to the structure of said vehicle, to which said unit is to be attached.

"Distal end" is taken to mean the free end or side edge of the limb when the cradle is not connected to the vehicle structure.

Purely by way of illustration, these fixing members comprise lugs provided with orifices for the passage of the shaft of fixing members, such as bolts.

The cradle comprises at least two different limbs, said thrust unit comprises two anchoring members, each of these anchoring members being connected to a different limb of said cradle.

The cradle comprises at least two different limbs, said thrust unit comprises two anchoring members, each of these anchoring elements being connected to a different limb of said cradle.

In order to orient the engine, in addition to the universal link, two hydraulic servo-actuators are put into operation to supply the increased power necessary in order to orient the nozzle.

The engine can advantageously be oriented by an angle of ±5° about the directions y and z where the axis x is placed along the longitudinal axis of the thrust unit.

Said at last one anchoring member is a locked servo-actuator.

It may be a mechanically locked servo-actuator or an assembly comprising a servo-actuator and a connecting rod for mechanically locking said servo-actuator.

At least some of said limbs comprise a housing for receiving an arm supporting a handling appliance of said cradle.

Said housing is preferably placed at the distal end of the corresponding limb.

Advantageously, said housing having a hollow tubular shape, an orifice with an axis transverse to the longitudinal axis of said housing allows the introduction of a fixing to ensure the locking of said support arm in said housing.

The presently disclosed embodiment likewise relates to a launch vehicle equipped with a thrust unit as described previously.

This launch vehicle is advantageously a spacecraft provided with two turbojet engines to guarantee its takeoff/landing from an airport runway and with a rocket engine allowing it to reach an altitude of at least sixty (60) kilometers alone, before unleashing a ballistic movement phase to reach an altitude of at least one hundred (100) kms.

In a utility version, this launch vehicle is provided with at least one storage zone capable of receiving a payload such as a small satellite and possibly also an orbiting system for said satellite, particularly comprising a propulsion device. This storage zone is preferably equipped with at least one articulated and retractable arm, allowing this small satellite to be handled so that it can be placed in orbit or recover its orbit.

In a passenger transportation version, this launch vehicle comprises a cabin with one or several seats. This cabin is likewise provided with a plurality of windows, ensuring passengers have an outside view from the spacecraft.

Gripping devices such as handles are placed proximate to these windows to allow passengers to hold on when weightless.

Of course the spacecraft may at the same time comprise a cabin for receiving one or several passengers and a payload storage zone.

The presently disclosed embodiment is also aimed at a handling assembly for the assembly/dismantling of the thrust unit, as previously described, as well as the transportation thereof.

According to the presently disclosed embodiment, this assembly comprises:

two longitudinal rails, each comprising a first portion of guide rail to be assembled on the inside to the structure of the vehicle and a second guide rail portion integral with a chassis, said chassis being mobile, at least in terms of vertical displacement, such that said guide rail portions of the same longitudinal rail can be placed end to end to form two side longitudinal guide rails, and a carriage movable in a straight line along said longitudinal rails, said carriage comprising two pairs of detachable support arms, each of said arms being for assembly to said cradle to support said unit after it has been dismantled from the vehicle structure to which it is to be attached.

According to one aspect, this mobile carriage equipped with connecting rods, guarantees the recovery of the mass of the rocket engine via its engine mount or cradle. This mobile carriage holds the engine which, once disconnected from the vehicle, slides on the guide rails and meets a handling chassis itself provided with rails. This handling chassis receives the engine held by the mobile carriage.

In different specific aspects of this handling assembly, each one having its particular advantages and being open to numerous possible technical combinations:

said carriage comprises two longitudinal structural parts equipped with running gear suitable for ensuring the movement of said carriage along said guide rails, said longitudinal parts being spaced laterally relative to one another, being connected to one another by a mechanical reinforcement part, preventing any gap between said parts when said carriage supports said thrust unit, said carriage thereby defining a fork capable of receiving between said parts the engine of the thrust unit when said carriage is introduced into said vehicle.

This mechanical reinforcement part is advantageously a connecting rod.

Said chassis can be moved with vertical displacement to ensure that said guide rail portions are in view.

Said chassis is preferably mounted on an articulated structure in such a manner as to be displaced between a low rest position and a high service position, said articulated structure being mobile.

Purely by way of illustration, this articulated structure is a scissor structure, said scissor structure being integral with a mobile chassis, such as a chassis equipped with wheels.

Said chassis has a transverse cross section in the shape of a U, to receive said carriage without any risk of damaging said thrust unit.

Said cradle being in the shape of a cross or also an X, said mobile carriage comprises two pairs of detachable support arms, each arm being for assembly on a different limb of this cradle, to support said unit after it has been dismantled from the structure of the vehicle to which it is to be attached.

Advantageously, said assembly comprises fixing parts for the end of said arms on said cradle limbs.

For example, these fixing parts are metal hinges.

At least one arm of said pairs preferably comprises a main connecting rod for connecting a limb of said cradle to said carriage and a secondary connecting rod, referred to as the transverse connecting rod, connecting said main connecting rod to said carriage in a slanting manner, in such a way as to block the rotation of said cradle in respect of said carriage.

BRIEF DESCRIPTION OF THE DRAWINGS

Other advantages, aims and particular characteristics of the presently disclosed embodiment will emerge from the following description, intended to be explanatory rather than limiting, with regard to the attached drawings in which.

DETAILED DESCRIPTION

It should first be noted that the figures are not to scale.

Figure 1:
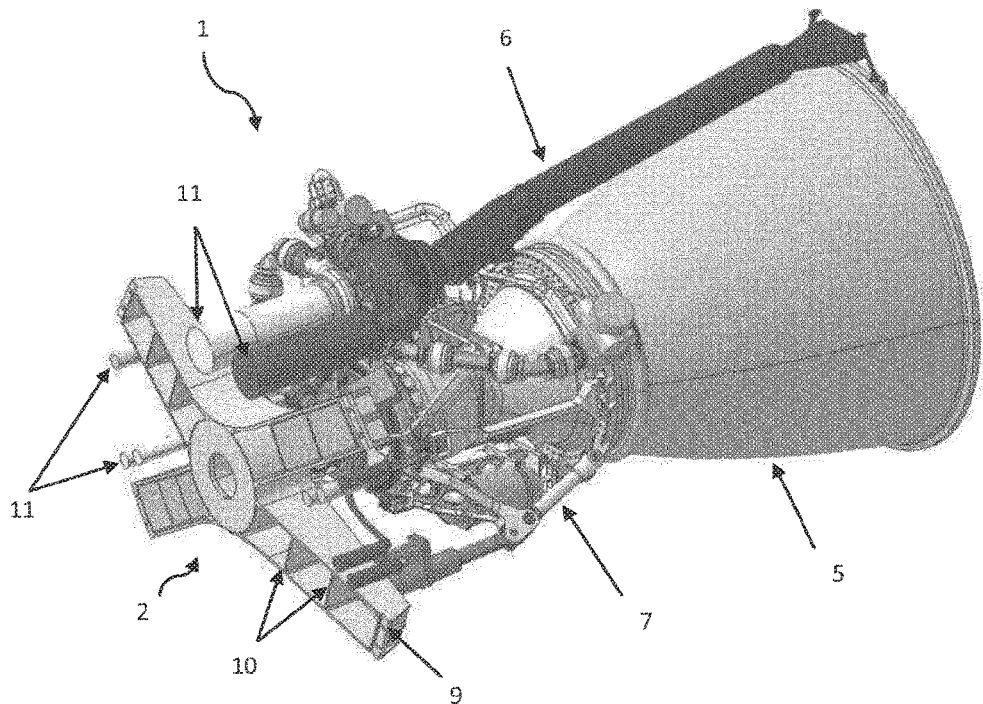
FIG. 1 depicts schematically a thrust unit according to a particular aspect of the presently disclosed embodiment.
Figure 2:
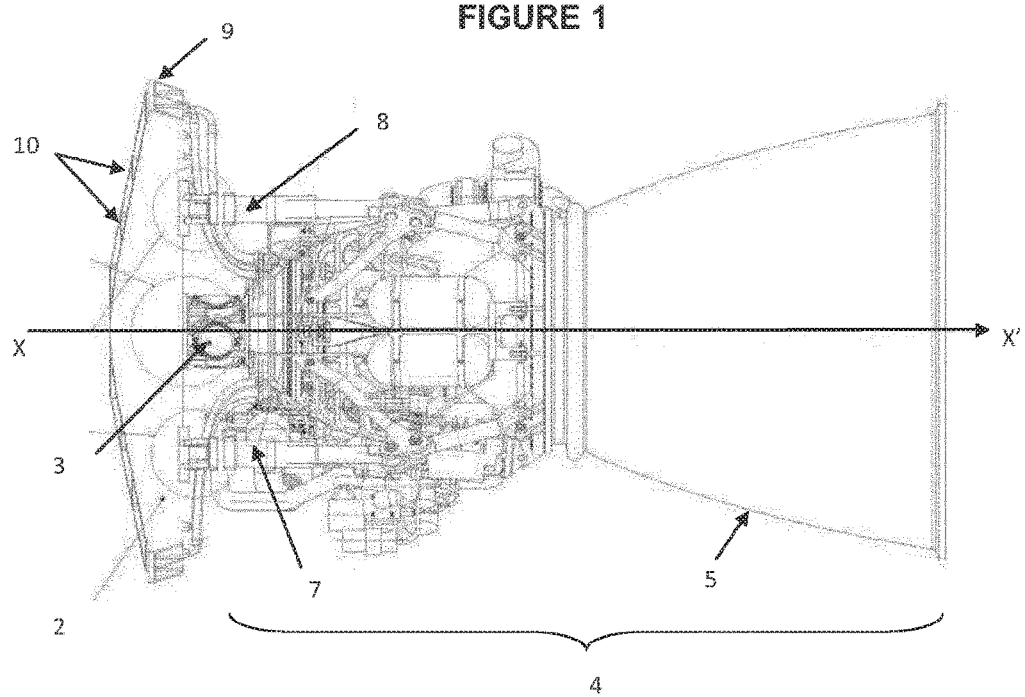
FIG. 2 is a view from below of the thrust unit in FIG. 1.
Figure 3:
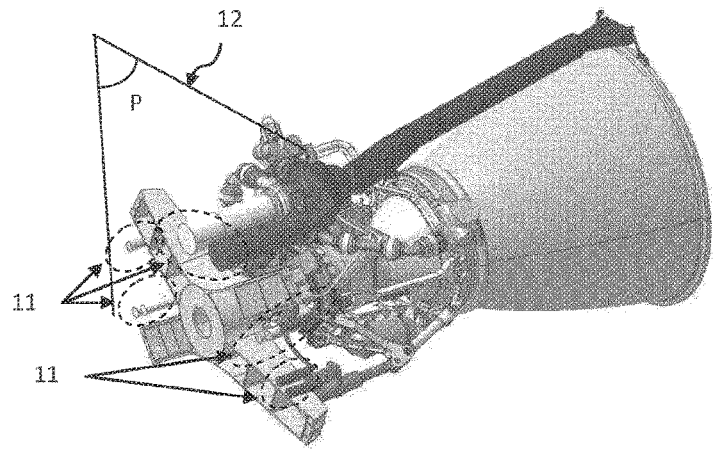
FIG. 3 is a perspective view of the thrust unit in FIG. 1 showing the connection heads of the fluid and electrical links placed in a dismantling plane of the cradle.
Figure 4:
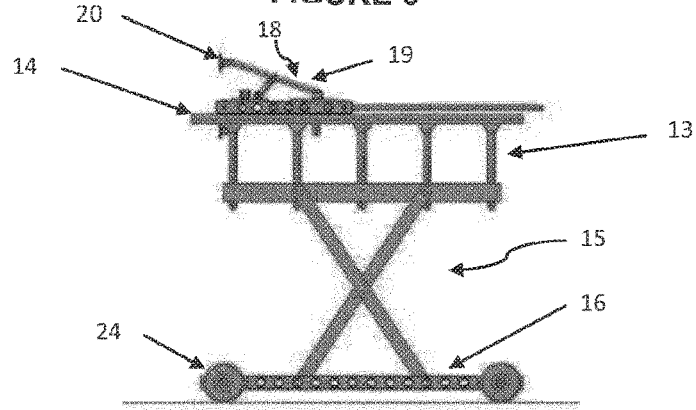
FIG. 4 depicts schematically a handling assembly of the thrust unit in FIG. 1 according to a particular aspect of the presently disclosed embodiment.
Figure 6:
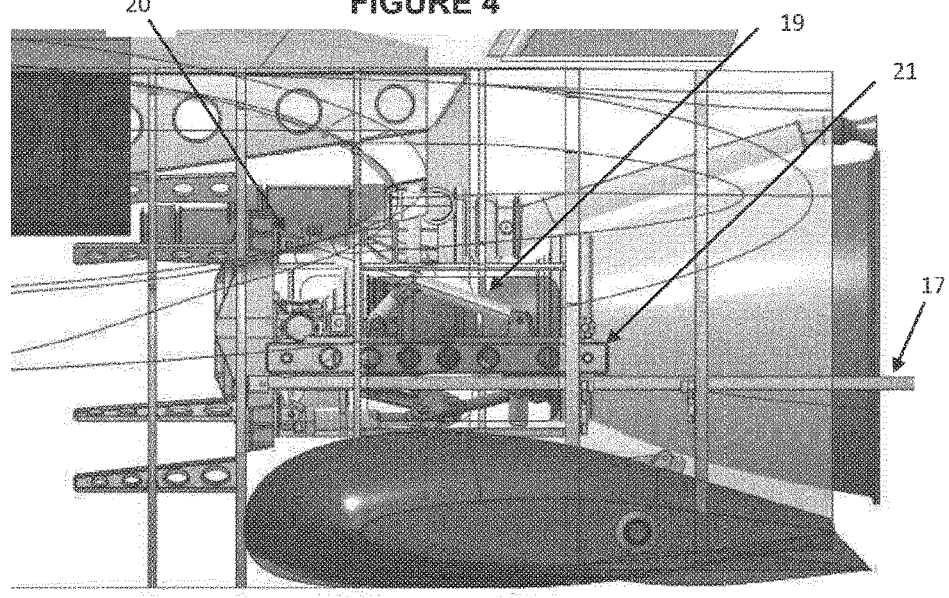
FIG. 6 is an enlarged view of FIG. 5 representing the only rear section of the spacecraft transparently to show the assembly of the guide rails on the surrounding structure of the spacecraft, as well as the assembly of the arms of the mobile carriage on the cradle of the thrust unit, with a view to supporting it following its dismantling.
Figure 5:
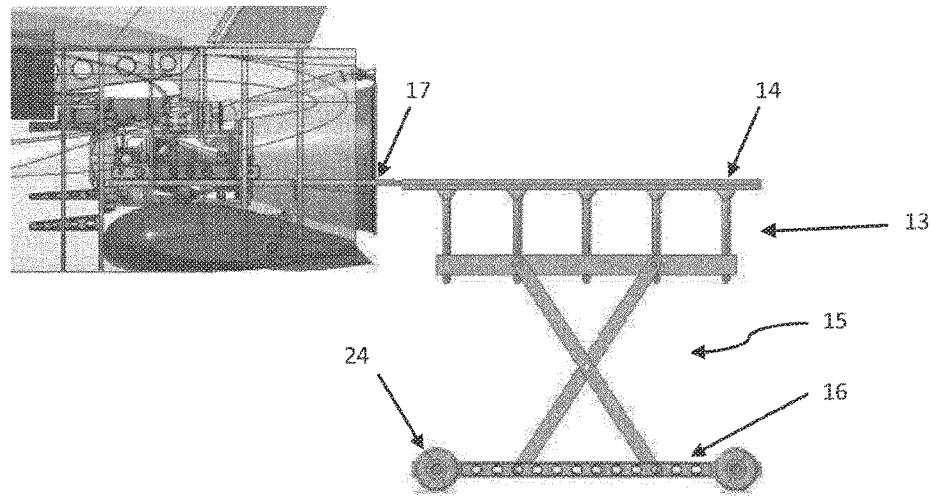
FIG. 5 shows one of the dismantling stages of a thrust unit by means of the handling assembly in FIG. 4 in which, the thrust unit always being integral with the structure of the launch vehicle, the arms of the mobile carriage introduced into the spacecraft are assembled on the cradle of the thrust unit, the rear part of the spacecraft being represented here transparently in the interests of clarity.
Figure 7:
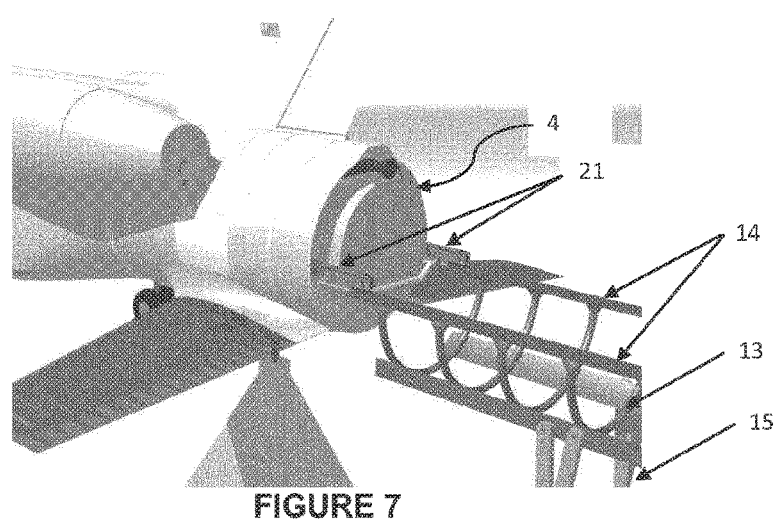
FIG. 7 is a perspective view of FIG. 6 showing the rear section of the spacecraft, the mobile carriage still being placed on the inside of the spacecraft and assembled by means of its arms on the thrust unit for the purpose of removing it.
Figure 8:
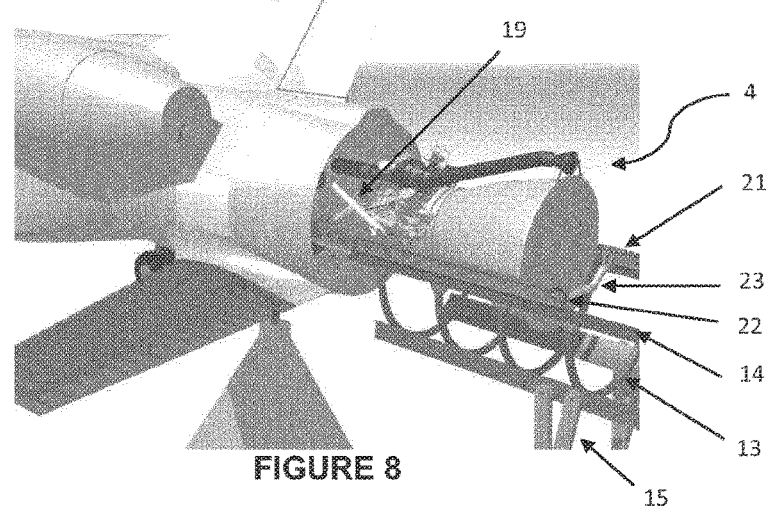
FIG. 8 is a perspective view of FIG. 6 in which the thrust unit has been partially removed from the rear section of the spacecraft and received on the mobile chassis for handling purposes.
Figure 9:
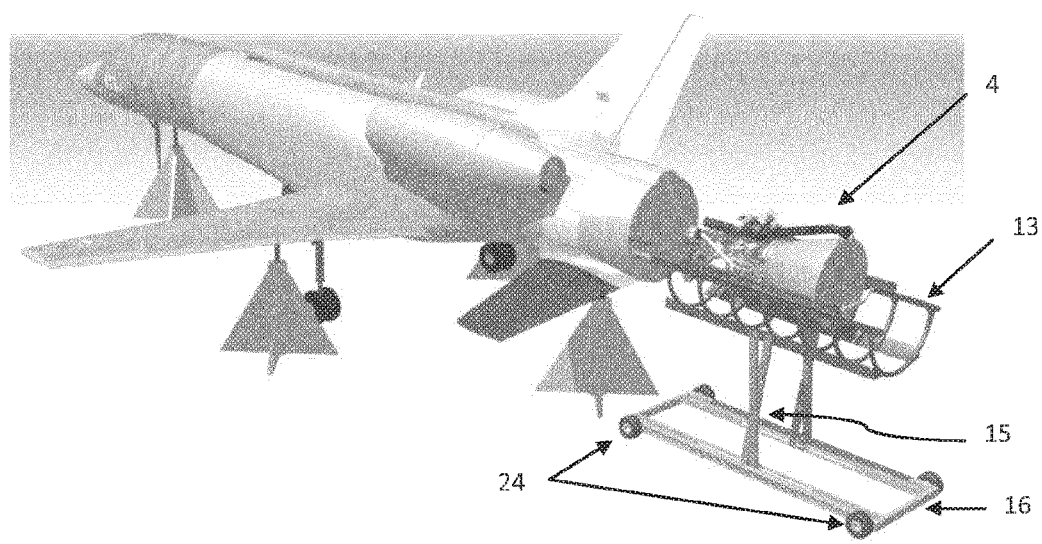
FIG. 9 is a perspective view of FIG. 6 showing the spacecraft in its entirety, the thrust unit being entirely withdrawn from the rear section of said spacecraft and received on the mobile chassis of the handling assembly, said handling assembly still being connected to the rear section of the spacecraft.
Figure 10:
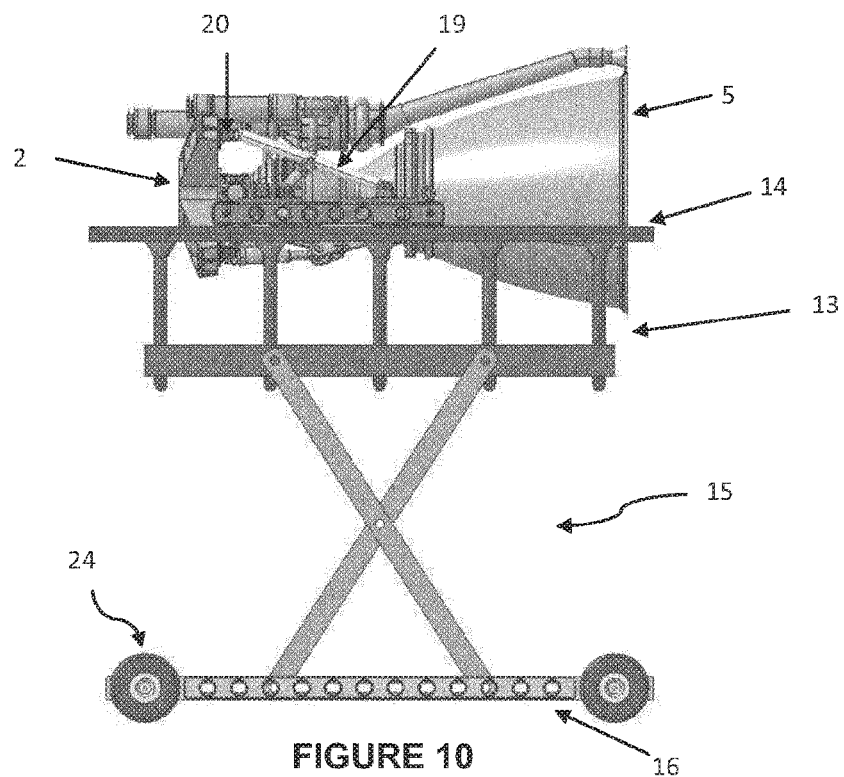
FIG. 10 shows the thrust unit in FIG. 1 received on the handling assembly in FIG. 4.

FIGS. 1 to 3 show a thrust unit 1 for a reusable spacecraft according to a preferred aspect of the disclosed embodiment.

This thrust unit 1 comprises a cradle 2 or engine mount, on which a rocket engine 4 is mounted by means of a universal link 3. The cradle 2 is preferably realized in a metallic or composite material. By way of illustration, in this case it is realized in aluminum alloy.

This rocket engine 4 comprises a thruster or engine fed with propellants to generate the combustion gases which, following acceleration in a nozzle 5, are ejected to supply the thrust required by the spacecraft. This thrust is transmitted to the structure of the spacecraft by the slant of the cradle 2.

This thruster is advantageously supplied with fuel such as liquid methane and with an oxidant such as liquid oxygen through the slant of a plurality of injectors, ensuring the pulverization and mixing of these propellants in the thruster.

These injectors are connected to pumping circuits, allowing the thruster to be supplied with oxidant and fuel. An auxiliary nozzle 6 placed at the side of the nozzle 5 ensures that gases generated during the pumping of the fuel and oxidant escape. This auxiliary nozzle 6 provides additional thrust to the spacecraft.

The nozzle 5 is made up of a single cooled piece, so that it can endure the high temperatures of the ejected combustion gases. The nozzle 5 defines a symmetrical longitudinal axis X-X'.

The cradle 2 in this case is in the shape of a cross which defines an interface plane. The rotation of this nozzle 5 about the axis X-X' is blocked by two mechanically locked servo-actuators 7, 8. Each servo-actuator 7, 8 is connected firstly to the nozzle 5 and secondly to a cradle limb 2, said limbs being distinct and contiguous.

The assembly formed by the cradle 2, the engine and the servo-actuators 7, 8 thereby constitutes a fixed assembly, the dismantling whereof is realized at the fixings of said assembly on the structure of the spacecraft.

The free ends of the limbs of the cradle 2 in this case comprise lugs 9 exhibiting orifices through which the fixing member shafts, such as bolts, can pass.

Moreover, in order to reduce the weight of the cradle 2 while retaining a high level of mechanical resistance, each limb of the cross is hollow but comprises reinforcing ribs 10.

The thrust unit 1 comprising fluid circulation lines and electrical supply lines, each comprising a detachable link at their free end, or a connection head 11 to be assembled on or connected to a corresponding circuit of the spacecraft to which this thrust unit 1 is to be connected, none of these connection heads 11 of the thrust unit 1 surpasses or even projects beyond a dismantling plane 12 passing through limbs of the cradle 2. This dismantling plane 12 of the thrust unit is therefore the interface plane of the thrust unit with the vehicle on which this unit is to be mounted.

The connection heads 11 of the fluid circulation lines and the electrical supply lines are advantageously placed at the free ends of the cradle limbs 2 in the dismantling plane 12.

The main engine propellant supply lines are advantageously positioned between two contiguous limbs of the cradle 2, in order to allow easy access to the inside of the spacecraft by an operative.

The presently disclosed embodiment also relates to a handling assembly for the assembly/dismantling of the thrust unit 1 described above.

FIGS. 4 to 10 show a handling assembly of the thrust unit as described above, according to a particular aspect of the presently disclosed embodiment.

This handling assembly comprises a chassis 13 exhibiting a U-shaped transverse section such as to define a housing to receive a thrust unit. This chassis 13 likewise comprises on its upper end a first pair 14 of side guide rails and is mounted on an articulated structure 15 of the scissor kind in such a manner as to be able to be moved between a low resting position and a high service position.

This articulated structure 15 is integral with a platform 16 equipped with wheels 24 to ensure the movement of this chassis 13.

This handling assembly also comprises a second pair 17 of guide rails to be directly assembled on the surrounding structure of the spacecraft on either side of the thrust unit, the handling whereof must be guaranteed.

Once mounted on the inner structure of the spacecraft, these guide rails 17 are parallel or substantially parallel, so as to define a running track for a mobile carriage 18 capable of moving along these rails.

The guide rails of this second pair 17 further exhibit a longitudinal dimension ensuring that, once they are mounted on the internal structure of the spacecraft, they go past the rear section of this spacecraft, such that the guide rails of the first pair 14 supported by the mobile chassis 13 can be brought to face guide rails of the second pair 17 to form a continuous running track between the inside of the rear part of the spacecraft and the mobile chassis 13 placed on the outside of the spacecraft, for example on an airport runway.

Hence, once dismantled, the thrust unit can be transferred from the rear section of the spacecraft on the chassis 13 in such a manner as to be supported only by said chassis via the mobile carriage 18, being received in the housing provided to this end.

The U profile, as well as the dimensions of this housing, advantageously allows any deterioration in the thrust unit, through contact when this thrust unit is thereby received on the chassis, to be avoided.

To ensure the support of the thrust unit when it is dismantled, the carriage 18 comprises two pairs of support arms 19, each of these pairs of arms being placed on a side edge of the carriage 18, such that each support arm 19 of the same pair is assembled on a different limb, higher or lower, of the cradle 2.

Hence, the carriage 18 which can move in a straight line along the running track created by the guide rails of the first 14 and second 17 pairs of rails placed end to end is connected to each of the limbs of the cradle 2 by means of its support arms 19.

To allow the positioning of the carriage 18, each support arm 19 is detachable in such a manner that it can be assembled independently of the carriage 18 to the corresponding limb of the cradle 2 by an operative who has been introduced into the rear section of the spacecraft. To achieve this, a connected fixing part 20 is assembled to the corresponding limb beforehand, with a view to receiving and holding the end of the corresponding support arm 19.

Moreover, this carriage 18 comprises two longitudinal structural parts 21 equipped with running devices 22 capable of guaranteeing the movement of this carriage 18 along guide rails 14, 17, these longitudinal parts 21 being spaced laterally one in respect of the other, being connected to one another by a mechanical reinforcement part 23 which is a connecting rod in this case, in such a manner as to prevent any gap between these longitudinal parts 21 when said carriage 18 supports the thrust unit, this carriage 18 thereby defining a fork capable of receiving between said longitudinal parts 21 the rocket engine 4 of the thrust unit 1 when said carriage 18 is introduced into said vehicle. The other end of the support arms 19 is made integral with these longitudinal parts 21 of the carriage 18.

The presently disclosed embodiment therefore advantageously allows the dismantling, replacement and reassembly periods of the rocket motor or rocket motors of a launch vehicle during maintenance to be minimized.

What is claimed is:

1. A thrust unit for a reusable launch vehicle comprising a rocket engine supported by a cradle, wherein:
    said cradle comprises at least three fixing members for the assembly of said thrust unit on a structure of said reusable launch vehicle;
    said at least three fixing members defining a plane for dismantling said thrust unit; and
    said thrust unit further comprises one or more links, the one or more links comprising one or more of fluid links and electrical links, of said rocket engine, each of the one or more links comprising a free end configured for coupling with a corresponding circuit for supplying the reusable launch vehicle, a tip of at least some of said free ends is contained in said dismantling plane.

2. The thrust unit as claimed in claim 1, wherein the tip of the free end of each of said links is contained in said dismantling plane.

3. The thrust unit as claimed in claim 1, wherein said thrust unit further comprises at least one anchoring member for blocking the rotation of the rocket engine in respect of said cradle, said at least one anchoring member being connected firstly to said rocket engine and secondly to a corresponding anchoring point on said cradle.

4. The thrust unit as claimed in claim 1, wherein said cradle is extended, exhibiting in a transverse dimension of said cradle a front face and a rear face, said front face being configured for assembly with said rocket engine, said front face defining a front plane of said cradle containing at least one section of said front face, said at least one section exhibiting dimensions allowing the fixing of anchoring members of said rocket engine.

5. The thrust unit as claimed in claim 4, wherein said cradle exhibits a shape chosen from the group comprising a disc shape, a cross shape, an A shape, an H shape, a Y shape, a T shape.

6. The thrust unit as claimed in claim 4, wherein said rear face defines a rear plane of said cradle, so that said front and rear planes are parallel or substantially parallel.

7. The thrust unit as claimed in claim 3, wherein said cradle comprising at least two different limbs and at least two anchoring members, each of said anchoring members is connected to a different limb of said cradle.

8. A launch vehicle equipped with the thrust unit according to claim 1.

9. A handling assembly for the assembly and dismantling of the thrust unit according to claim 1 and the transportation of the thrust unit, wherein the handling assembly comprises;
    two longitudinal rails, each comprising a first portion of guide rails to be assembled on the inside to the structure of the reusable launch vehicle and a second guide rail portion integral with a chassis;
    said chassis being mobile, at least so as to be vertically displaced, such that said guide rail portions of the same longitudinal rail are configured to be placed end to end to form two side longitudinal guide rails, and
    a carriage movable in a straight line along said longitudinal rails, said carriage comprising two pairs of detachable support arms, each of said arms being for assembly to a different limb of said cradle to support said thrust unit after said thrust unit has been dismantled from the structure of said reusable launch vehicle.

10. The handling assembly as claimed in claim 9, wherein said carriage further comprises two longitudinal structural parts equipped with running gear suitable for ensuring the movement of said carriage along said guide rails, said longitudinal parts being spaced laterally relative to one another, being connected to one another by a mechanical reinforcement part, preventing any gap between said parts when said carriage supports said thrust unit, said carriage thereby defining a fork capable of receiving between said longitudinal parts the rocket engine of the thrust unit when said carriage is introduced into said reusable launch vehicle.

11. The handling assembly as claimed in claim 9, wherein said chassis is mobile so as to be vertically displaced to ensure that said guide rail portions are in view.

12. The handling assembly as claimed in claim 11, wherein said chassis is mounted on an articulated structure so as to be displaced between a low rest position and a high service position, said articulated structure being mobile.

13. The handling assembly as claimed in claim 9, wherein said chassis has a transverse cross section in the shape of a U, to receive said carriage without any risk of damaging said thrust unit.

14. The handling assembly as claimed in claim 9, wherein said cradle being in the shape of a cross or also an X, said mobile carriage comprises two pairs of detachable support arms, each arm being for assembly on a different limb of this cradle, to support said thrust unit after said thrust unit has been dismantled from the structure of the reusable launch vehicle.

15. The handling assembly as claimed in claim 14, further comprising fixing parts for the end of said support arms on said cradle limbs.

16. The handling assembly as claimed in claim 14, wherein at least one support arm of said pairs comprises a main connecting rod for connecting a limb of said cradle to said carriage and a secondary connecting rod, referred to as the transverse connecting rod, connecting said main connecting rod to said carriage in a slanting manner, so as to block the rotation of said cradle in respect of said carriage.

* * * * *